(No Model.)

H. RENTCHLER.
VEHICLE TOP JOINT.

No. 253,313. Patented Feb. 7, 1882.

Witnesses.
F. L. Ouraud,
L. L. Miller.

Inventor.
Henry Rentchler
per Chas. H. Fowler
Attorney

UNITED STATES PATENT OFFICE.

HENRY RENTCHLER, OF BELLEVILLE, ILLINOIS.

VEHICLE-TOP JOINT.

SPECIFICATION forming part of Letters Patent No. 253,313, dated February 7, 1882.

Application filed September 9, 1881. (No model.)

*To all whom it may concern:*

Be it known that I, HENRY RENTCHLER, a citizen of the United State, residing at Belleville, in the county of St. Clair and State of Illinois, have invented certain new and useful Improvements in Vehicles; and I do hereby declare that the following is a full, clear, and exact description of the same, reference being had to the accompanying drawings, in which—

Figure 1:
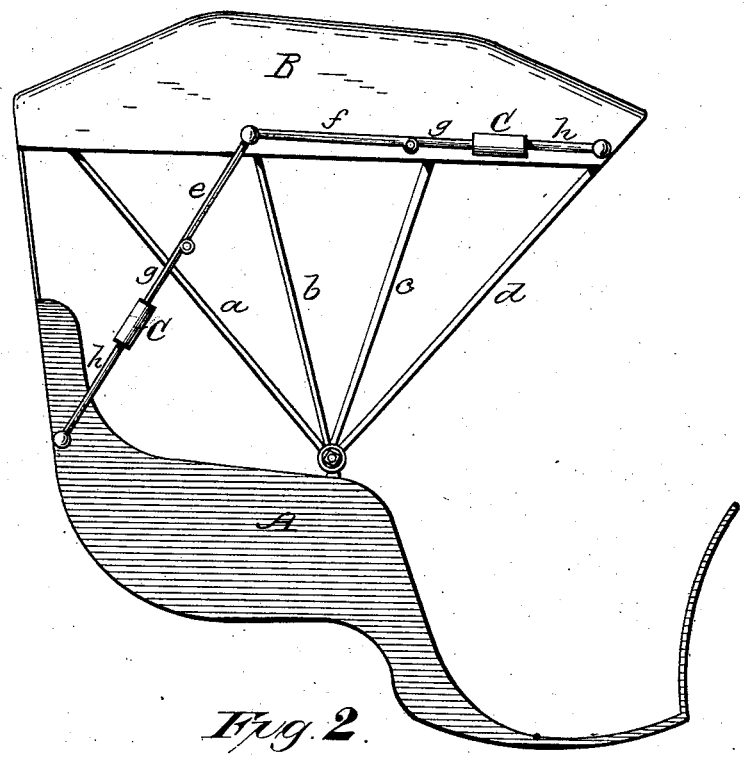
Figure 2:
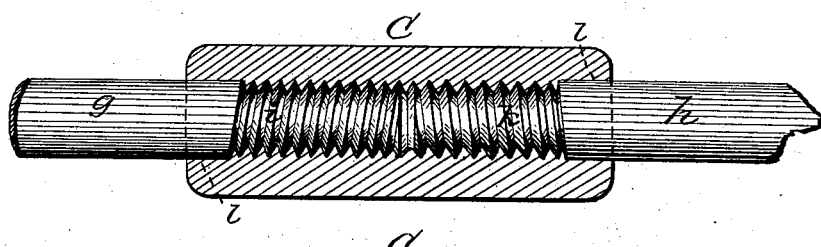
Figure 3:
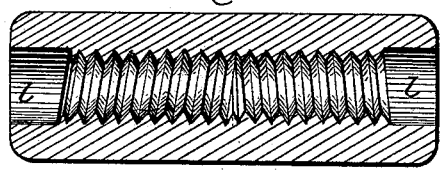

Figure 1 is a side elevation of a vehicle body and top, showing the application of my invention. Fig. 2 is a side elevation, in detail, of the screw-threaded brace-rods with the coupling-sleeve in section, and Fig. 3 is a sectional view of the sleeve disconnected from the brace-rods.

The present invention has relation to certain new and useful improvements in that class of top props and joints for carriages in which provision is made for adjusting the lengths of the joints or brace-rods to compensate for the stretching of the leather covering of the vehicle.

Previous to my invention the means usually employed for accomplishing this purpose were connected to the extreme ends of the brace-rods or at the joint.

The purpose of my invention is to improve the construction of the means ordinarily employed, whereby the brace-rods can be more readily adjusted or their lengths shortened while on the vehicle, and possessing increased strength and more effective in their object to compensate for the stretching of the canvas or leather covering of the vehicle. These objects I attain by the construction substantially as shown in the drawings and hereinafter described.

In the accompanying drawings, A represents the body of the vehicle having pivoted thereto the usual bows *a b c d*, to which is secured the top-covering B, of canvas, leather, or other like material from which such coverings are usually made.

The inner brace-rods, *e f*, are connected at the apex of the angle formed thereby to the top of the vehicle in the usual manner, and instead of connecting the device for taking up the slack or stretching the covering to the tension required at the extreme outer ends of the outer brace-rods, or securing it at the joint formed by the connection of said outer brace-rods with the brace-rods *e f*, I form the outer brace-rods in two sections, *g h*, and connect them at their inner ends with a coupling-sleeve, C, as shown in Fig. 2.

Upon the free or inner ends of the rods *g h* I form right and left screw-threads, *i k*, to engage with right and left screw-threads formed in the coupling-sleeve C, whereby the rods may be lengthened or shortened with relation to the sleeve by turning it in the proper direction, thereby stretching to any desired tension the covering B, or regulate to any required degree the strain thereon, thus compensating for contraction caused by cold or take up the slack or looseness by the expansion by heat or wear.

By forming the outer brace-rods in two sections or rods *g h*, and connecting them at their free or inner ends to a coupling-sleeve, C, not only admits of their convenient and ready adjustment, but the strain comes from two points alike and is more even and uniform, preventing the danger of injury to the joints or lateral strain upon the brace-rods *e f*. The outer ends of the coupling-sleeve C have plain extensions *l* of the same diameter as the diameter of the brace-rods *g h*, so that the full size of said rods above the screw-threads will enter the sleeve, as shown in Fig. 2, whereby the full strength of the brace-rods at the point of connection with the sleeve is obtained.

It is always essential that the several jointed brace-rods of a carriage-top should be made as light as possible consistent with the necessary strength and durability, and consequently were the screw-threads of the coupling-sleeve extended the entire length thereof there would be a great tendency of the brace-rods breaking off at the ends of the coupling-sleeve, the line or point of fracture coinciding with the last thread of the screw cut upon the ends of the brace-rods. This difficulty I have wholly removed by extending the ends of the coupling-sleeves beyond the screw-threaded portion thereof, and having a smooth bore equal in diameter to that of the smooth portion of the brace-rods, whereby it will enter the bore and fit snugly and thereby stiffen and strengthen the joint and prevent the liability of the rods being broken by the twisting or turning of the sleeve.

Having now fully described my invention, what I claim as new, and desire to secure by Letters Patent, is—

1. In a vehicle having the usual covering and bows for supporting the same, the combination, with the brace-rods $e\ f$, of the right-and-left screw-rods $g\ h$, forming the outer brace-rods of the vehicle-top, and connected at their inner or screw-threaded ends with a coupling-sleeve, C, having a right and left screw-thread, and formed in a single piece to make a rigid connection between the rods $g\ h$, substantially as and for the purpose set forth.

2. In a vehicle, the combination, with the brace-rods $e\ f$ and rods $g\ h$, having right and left screw-threads, as shown, of the right and left screw-threaded coupling-sleeve C, having the plain extensions $l$ at its ends, of such diameter as to receive the plain or unscrew-threaded portions of the rods $g\ h$, substantially as and for the purpose specified.

HENRY RENTCHLER.

Witnesses:
ALBERT G. BADGLEY,
WESLEY L. PIEPER.